(12) United States Patent
Amnered et al.

(10) Patent No.: US 6,814,563 B2
(45) Date of Patent: Nov. 9, 2004

(54) HOLDING DEVICE FOR HOLDING AN ARTICLE AND A PLANT FOR HEAT TREATMENT OF AN ARTICLE

(75) Inventors: Roger Amnered, Linköping (SE); Jan Andersson, Linköping (SE); Torbjörn Bergehed, Linköping (SE); Per Eliasson, Norsholm (SE); Jan-Ole Karlsson, Linköping (SE); Johnny Karlsson, Linköping (SE); Sverker Schultz, Åtvidaberg (SE); Bo Tolf, Rimforsa (SE); Ingemar Turesson, Linköping (SE); Anders Westerdahl, Linköping (SE)

(73) Assignee: SAAB AB, Linkoping (SE)

( * ) Notice: Subject to any disclaimer, the term of this patent is extended or adjusted under 35 U.S.C. 154(b) by 194 days.

(21) Appl. No.: 10/168,134
(22) PCT Filed: Dec. 22, 2000
(86) PCT No.: PCT/SE00/02656
§ 371 (c)(1),
(2), (4) Date: Jun. 19, 2002
(87) PCT Pub. No.: WO01/47695
PCT Pub. Date: Jul. 5, 2001

(65) Prior Publication Data
US 2002/0192327 A1 Dec. 19, 2002

(30) Foreign Application Priority Data
Dec. 23, 1999 (SE) .............................................. 9904769

(51) Int. Cl.⁷ .............................................. B29C 70/44
(52) U.S. Cl. ................ 425/389; 269/289 R; 425/405.1; 425/446
(58) Field of Search .............................. 425/389, 405.1, 425/446; 269/289 R

(56) References Cited

U.S. PATENT DOCUMENTS

| | | | | |
|---|---|---|---|---|
| 4,869,770 A | * | 9/1989 | Christensen et al. | 156/286 |
| 4,882,118 A | * | 11/1989 | Megarry | 425/389 |
| 4,902,215 A | | 2/1990 | Seemann, III | 423/383 |
| 5,015,168 A | * | 5/1991 | Boime et al. | 425/389 |
| 5,316,462 A | | 5/1994 | Seemann | 425/382 |
| 5,403,537 A | | 4/1995 | Seal et al. | 264/571 |
| 5,529,472 A | | 6/1996 | Jenkins | 425/405.1 |
| 5,731,015 A | * | 3/1998 | Bartilucci et al. | 425/389 |
| 5,902,535 A | * | 5/1999 | Burgess et al. | 425/389 |
| 5,968,445 A | * | 10/1999 | McCarville et al. | 425/389 |
| 5,993,184 A | * | 11/1999 | Morrow | 425/389 |
| 6,012,883 A | * | 1/2000 | Engwall et al. | 409/132 |
| 6,146,576 A | * | 11/2000 | Blackmore | 425/389 |

FOREIGN PATENT DOCUMENTS

EP     0697272 A2    2/1996

* cited by examiner

*Primary Examiner*—Robert B. Davis
(74) *Attorney, Agent, or Firm*—Swidler Berlin Shereff Friedman, LLP

(57) ABSTRACT

The invention refers to a plant and a holding device in connection with heat treatment of articles (3), which is at least partly manufactured in a thermosetting composite material. The holding device, which is comprised by the plant, includes a base element (1), and intermediate element (2), which rests on the base element (1), and at least a support member (4), which is fixable to the intermediate element (2) and arranged to support said article (3) on the intermediate element during the heat treatment. The intermediate element (2) is manufactured in a material which has a neglectable thermal extension at least up to a temperature level, at which the heat treatment is intended to take place. Furthermore, the intermediate element (2) is displaceably positioned on the base element (1).

17 Claims, 3 Drawing Sheets

HOLDING DEVICE FOR HOLDING AN ARTICLE AND A PLANT FOR HEAT TREATMENT OF AN ARTICLE

THE BACKGROUND OF THE INVENTION AND PRIOR ART

The present invention refers to a holding device for holding an article, which is at least partly manufactured in a thermosetting composite material in connection with heat treatment of said article. The invention also refers to a plant for heat treatment of an article, which is at least partly manufactured in thermosetting composite materials.

It is known to manufacture many articles and construction elements for, for instance, vehicles, ships and aircraft of thermosetting composite materials including fibres, such as glass fibres or carbon fibres. Such composite materials are characterised by a high strength and a relatively small weight. In typical cases, a construction element includes a shell of composite material and a cell core, which may have a honeycomb structure and be enclosed by the shell.

Such a construction element may be manufactured by positioning a not yet set disc, which includes fibres and a plastics, on a holding device with a mould bed of steel or aluminium. Above this disc, a cell core and set edge elements, which includes fibres and a plastics and which surround the cell core, are positioned. On the bed, tool parts or support members, which adjoin the edge element and form a support for the construction element, are mounted. These support members are manufactured in steel or aluminium. Thereafter, a not yet set pre-impregnated laminate, which includes fibres and a plastics, is positioned above the cell core.

Above the support members and the upper disc, a tearing-off cloth or the like is placed and thereafter a substantially close cloth is provided above the tearing-off cloth. The space beneath the close cloth is vacuum pumped and the holding device is introduced into an autoclave, in which the temperature and the pressure are increased successively to desired levels in order to set the construction element. In typical cases, this thermosetting temperature is about 180° C. When the thermosetting has been obtained, the holding device is removed from the autoclave and the construction element is dismounted from the holding device.

One problem, which is connected to such a manufacturing of composite articles, is that the mould bed expands due to the raised thermosetting temperature. This means that the support members will have other mutual dimensions at the setting temperature than at the room temperature, at which the article to be set is mounted to the holding device. This problem is especially stressed for relatively large construction elements. In order to solve this problem, the holding device has to be dimensioned in such a way that it has proper dimensions at the thermosetting temperature. Such a dimensioning is time and labour consuming.

SUMMARY OF THE INVENTION

The object of the present invention is to remedy the problems described above and to enable a manufacturing of articles of thermosetting composite materials with a high precision. Especially, it is referred to relatively large articles.

This object is obtained by the holding device initially defined, which includes a base element, an intermediate element, which rests on the base element, and at least a support member, which is fixable to the intermediate element and arranged to support said article on the intermediate element during the heat treatment, wherein the intermediate element is manufactured in a material which has a neglectable thermal expansion at least up to a temperature level, at which the heat treatment is intended to take place, and wherein the intermediate element is displaceably positioned on the base element.

By such an intermediate element, the underlying base element or the bed may be permitted to expand due to a raised temperature during the heat treatment without influencing the position of the support members in relation to each other and to the intermediate element. Consequently, the support members may be positioned very exactly at the positions, which correspond to the shape of article to be manufactured. The holding device according to the invention thus permits a simple manufacturing of articles, which are at least partly manufactured in composite materials.

According to an embodiment of the invention, the intermediate element is at least partly manufactured in a first composite material. Composite materials have a substantially neglectable thermal expansion at least up to a temperature at which the composite material has been set. Such a material, which may be substantially the same as the composite material of the article to be manufactured, is therefore suitable as a carrier of this article and the support members, which define the outer contour of the article. Advantageously, the first composite material includes fibres and a plastic material. Said fibres may for instance include carbon fibres and said plastic material a thermosetting epoxy resin.

According to a further embodiment of the invention, said support member is at least partly manufactured in a material, which has a neglectable thermal expansion at least up to a temperature level at which the heat treatment is intended to take place. In such a way, the shape of the support member or support members may be maintained during the entire manufacturing process and heat treatment, wherein a high dimensional accuracy of the article to be manufactured may be obtained. Advantageously, said support member is thereby at least partly manufactured in a second composite material, which may include fibres and a plastic material, for instance carbon fibres and an epoxy resin. The second composite material may include a higher percentage of plastics than the first composite material and have a lower setting temperature. Said support member may be fixable at the intermediate element by means connecting members, for instance screw connectors.

According to a further embodiment of the invention, the intermediate element has a thickness which is thin in relation to the base element. In such a way, the cost of the holding device according to the invention may be kept at a low level and the previously used bed may substantially be maintained as carrier of the holding device and the article to be manufactured. The base element may at least partly be manufactured in a metal material, for instance including a steel material.

According to a further embodiment of the invention, the holding device includes a flexible, substantially close cloth, which is arranged to be placed over the entire intermediate element, said support member and said article, wherein the holding device includes attachment members arranged to permit closing attachment of the cloth to the base element. Furthermore, the holding device may include means arranged to permit removal of the gas present between the cloth and base element.

The invention is applicable to said article including a shell of composite material and a core enclosed in the shell. Such articles may for instance be used as construction elements in aircrafts, boats and ships, vehicles etc.

The object is also obtained by the initially defined plant, which includes a holding device according to the above description. Advantageously, the plant includes an enclosure, which is arranged to enclose the holding device during the heat treatment, and means for successively increase the temperature and the pressure in the enclosure to said temperature level and a desired pressure level.

BRIEF DESCRIPTION OF THE DRAWINGS

The present invention is now to be explained more closely by a description of different embodiments and with reference to the drawings attached.

DETAILED DESCRIPTION OF VARIOUS EMBODIMENTS OF THE INVENTION

Figure 1:
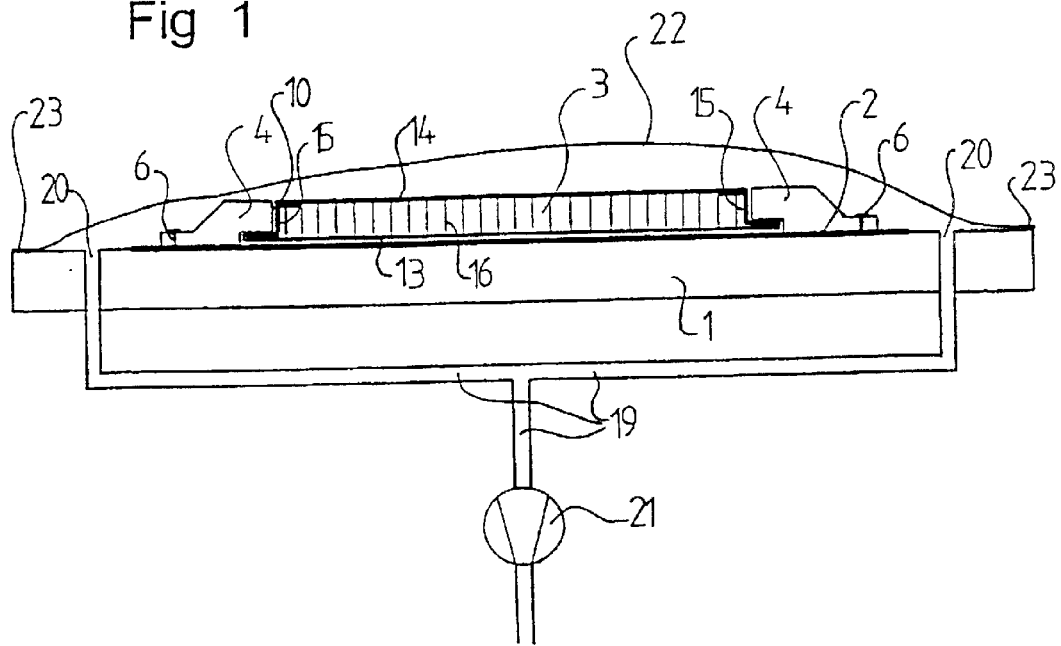
FIG. 1 discloses schematically a sectional side view of a holding device according to a first embodiment of the invention.
Figure 2:
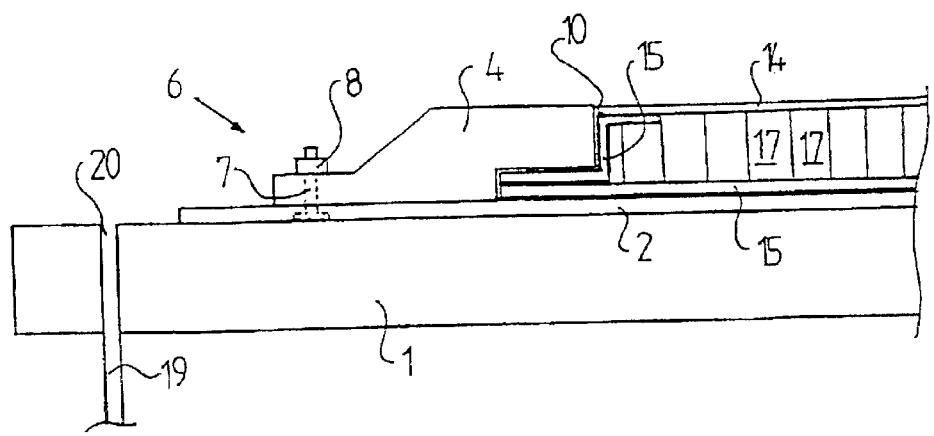
FIG. 2 discloses schematically a sectional view of a part of the holding device in FIG. 1.
Figure 3:
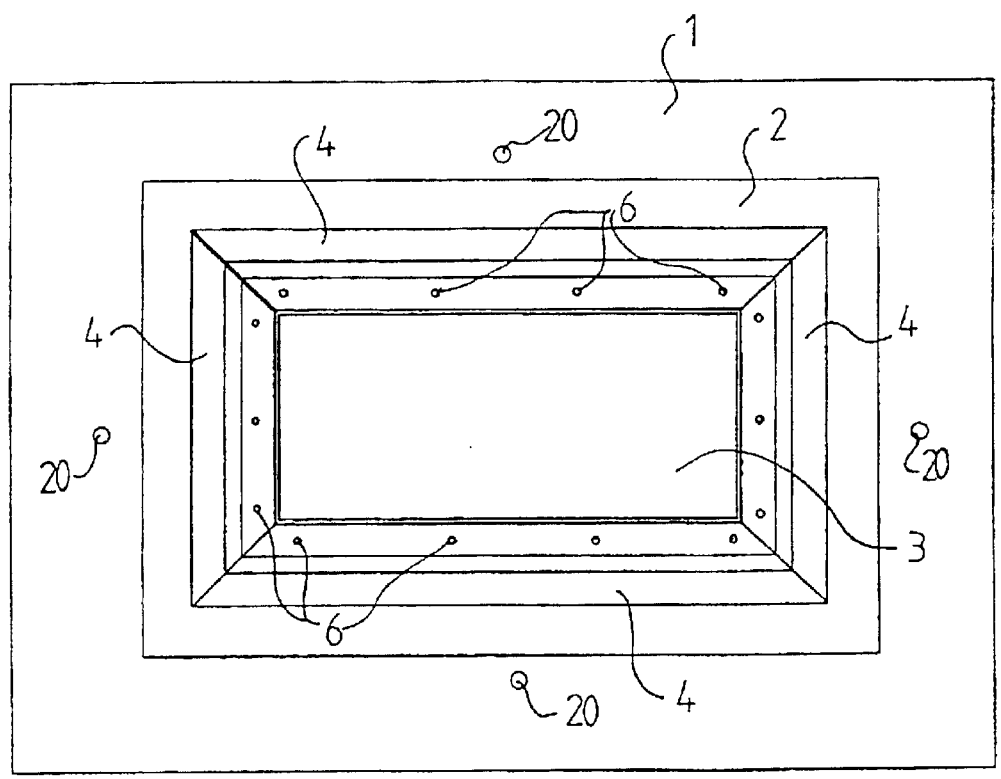
FIG. 3 discloses schematically a view from above of the holding device in FIG. 1.

FIGS. 1-3 disclose a first embodiment of a holding device according to the invention. The holding device includes a base element 1, which in the example disclosed forms a bed with an upper bed surface, which may have a size of for instance 10m$^2$. The base element 1 may be manufactured in steel or any other metal or metal alloy, such as for instance aluminium, nickel etc., and have a thickness of between 5 and 50 mm, preferably between 10 and 30 mm, for instance between 20 and 25 mm.

Figure 4:
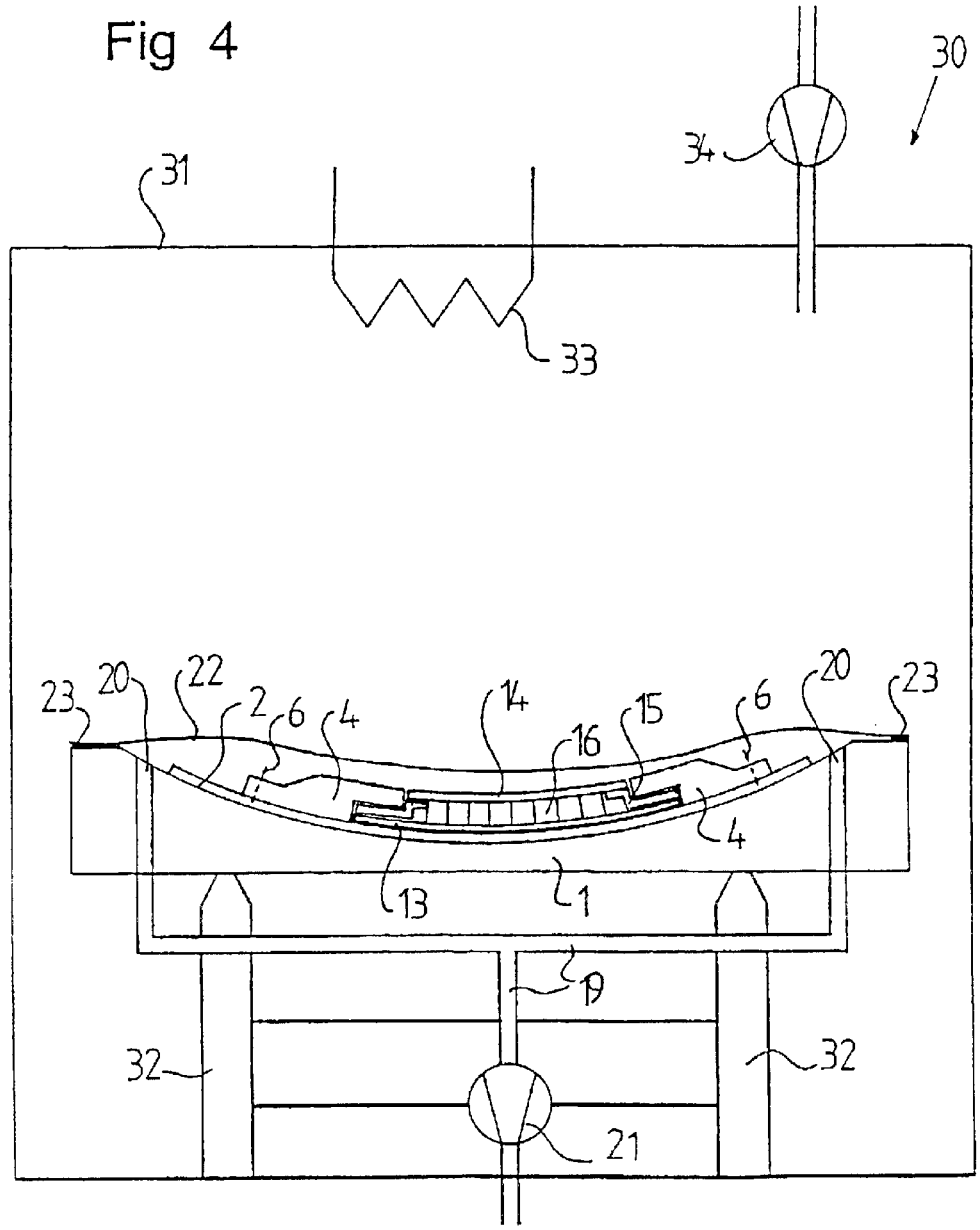
FIG. 4 discloses schematically a partly sectional view of a plant having a holding device according to a second embodiment of the invention.

On the bed surface of the base element 1, an intermediate element 2 is displaceably provided, i.e. the intermediate element 2 rests loosely on the base element 1. Above the intermediate element 2, an article 3 to be manufactured is placed. The intermediate element 2 forms a form element for the article 3, i.e. the intermediate element 2 forms a surface, which has a shape that corresponds to the shape of a surface of the article 3 to be manufactured. The intermediate element 2 is in the example disclosed relatively thin in comparison with the base element 1 and may be between 2 and 7 mm, preferably between 3 and 6 mm, or more specifically between 4 and 5 mm, for instance 4, 3 mm. Advantageously, the intermediate element 2 may have an upper surface, which is substantially parallel with a lower surface of the intermediate element. Thereby, also the upper bed surface of the base element 1 has advantageously a shape, which corresponds to the shape of a surface of the article 3 to be manufactured. However, the invention is not limited to such an embodiment, but the intermediate element 2 may have an upper surface against which the article 3 to be manufactured rests, and a lower surface, wherein these surfaces are not parallel. For instance, the upper surface may have a concave shape whereas the lower surface is substantially plane. In the embodiment disclosed in FIGS. 1-3, the upper surface and the lower surface of the intermediate element 2 are substantially plane as also the upper surface of the base element 1. FIG. 4 discloses a second embodiment of the invention, in which these surfaces have a curved shape. This second embodiment illustrates the possibility of manufacturing articles 3 with for instance a convex shape.

The intermediate element 2 is at least partly manufactured in a composite material, which has a very small thermally induced expansion within a temperature range referred to in the present application. Thereby, the intermediate element 2 may be manufactured in a composite material, which includes fibres and a plastic material. Such fibres may for instance be carbon fibres, glass fibres and/or other mineral fibres. The plastic material includes a thermosetting plastics, such as for instance epoxy resin.

The holding device also includes at least one support member 4, which is fixable to the intermediate element 2. In the example disclosed, the holding device includes four support members 4, see FIG. 3, which form a substantially rectangular frame supporting the article 3 to be manufactured. The inner surface of the frame thus defines the contour of the edge surface of the article 3 to be manufactured. In the example disclosed, the support members 4 are designed as substantially rectilinear support members 4. However, it is to be noted that the support members 4 may have a substantially arbitrary shape. It is also possible to design one single support member, such as the rectangular support frame disclosed in FIG. 3.

The support members 4 are fixable to the intermediate element 2 by means of connecting members 6. The support members 4 are thus merely attached to the intermediate element 2. Such as appears form FIG. 2, said connecting members 6 may include a screw connection with a screw 7, which extends through the intermediate element 2 and one of the support members 4, and which includes a screw head which is countersunk in the intermediate element 2, and a nut 8, which is threaded to the screw 7. Also other types of connecting members 6 are possible within the scope of the invention, for instance merely a bolt without threads, which extends through a hole in the intermediate element 2 and one of the support members 4 by a suitable fit. It is also possible to attach at least one or some of the support members 4 to the intermediate element 2 by means of a more permanent connection, for instance clueing. Each support member 4 has a support surface 10, which faces the edge surface of the article 3 to be manufactured. The support surface 10 thereby has a contour, which corresponds to the edge contour of the article 3 to be manufactured.

Also the support members 4 are manufactured in a composite material including fibres and a plastic material. The fibres may for instance be carbon fibres, glass fibres and/or any mineral fibres, and the plastic material may include for instance epoxy resin. The support members 4 include advantageously a higher percentage of plastic material than the intermediate element 2. The support members 4 are suitably manufactured by means of moulds of metal, such as aluminium or steel. Since such moulds expand at a higher temperature, the support members 4 may suitably be set at a lower temperature, such as between 100 and 140° C., for instance about 120° C. Thereafter, the support members 4 may set by themselves without any mould support in order to obtain a final shape of the support members 4 with a accuracy which is as high as possible.

The article 3 may be a construction element for an aircraft, a vehicle, a boat, a ship or for any other device, such as a machine or a building. The article 3 includes in the example disclosed a shell 13, 14, 15 and a core 16. The shell consists of a first disc 13, which in the example disclosed rests on the intermediate element 2, a second disc 14 and edge elements 15. The different parts 13, 14, 15 of the shell are manufactured in a composite material, including fibres, such as carbon fibres, glass fibres and/or other mineral fibres, and a plastic material, such as epoxy resin. The core 16 is thus enclosed in the shell 13, 14, 15. The core 16 may have a cell structure, whereby the weight of the article 3 may be kept at a low level, for instance a so called honeycomb structure.

Furthermore, the holding device includes means for removal of gas from an area above the base element 1. These means include channels 19, which has a respective orifice 20 in the upper bed surface of the base element 1 and which extend to a pump 21. Furthermore, there is a substantially close cloth 22 above the upper bed surface of the base element 1. The cloth 22 is attached along the periphery of the base element 1 by means of any attachment means 23, such as for instance adhering tape. The cloth 22 thus covers the orifices 20, the intermediate element 2, the support members 4 and the article 3 to be manufactured. By starting the pump 21, the gas, which is present between the cloth 22 and the base element 1, will thus be transported away and a vacuum is provided, wherein the cloth 22 will abut closely the article 3 to be manufactured. It is to be noted that further elements may be provided between the article 3 and the cloth 22, for instance a perforated plastic film most closely to the article 3 and a so called tearing-off cloth (not disclosed).

FIG. 4 discloses a plant 30, which includes an enclosure 31 arranged to receive the holding device. The holding device is arranged to be placed on carrier members 32 in the enclosure 31. The carrier members 32 may be provided with wheels or the like, wherein the holding device with the article 3 to be manufactured may be transported into and out of the enclosure 31 in an easy manner. Furthermore, the plant 30 includes a schematically disclosed heating device 31 for gradual increase of the temperature in the enclosure 31, and a compressor 34 for gradual increase of the pressure level in the enclosure 31.

The manufacturing of the article 3 may for instance be made in the following manner. The intermediate element 2 is placed on the base element 1. A first pre-impregnated laminate of a composite material including for instance carbon fibres and a not set epoxy resin, is placed on the intermediate element 2. It is to be noted that the surface of the first laminate, which faces the intermediate element 2, forms the disc 13 and outer surface of the article 3, i.e. the essential surface of the article 3. A cell core 16 is thereafter placed on the first laminate. Furthermore, the edge elements 15 are placed around the periphery of the cell core 16. Thereafter, the support members 4 are applied around the first laminate, the cell core 16 and the edge elements 15 and thus define the shape to be obtained by the final article 3. It is to be noted that the edge elements 15, when they are positioned around the cell core 16, already may be set and thus obtained their final shape and strength.

When the support members 4 have been fixed to the intermediate element 2, a second pre-impregnated laminate of composite material, including for instance carbon fibres and a not set epoxy resin, is applied above the cell core 16 in such a way that the second laminate, which forms the disc 14 of the shell extends above a flange of substantially each edge element 15. Thereafter, a perforated thin plastic film is applied above the second laminate and a so-called tearing-off cloth above the perforated plastic film. These two components are not disclosed in the figures. Above the tearing-off cloth the gas tight cloth 22 is then applied, which is attached by any adhering means 23 to the upper bed surface along the periphery of the base element 1.

Thereafter, the holding device is introduced into the enclosure 31, for instance by being applied onto the carrying members 32 which are rolled into the enclosure 31, which forms an autoclave. The space formed beneath the cloth 22 is now vacuum pumped by means of the pump 21 in such a way that the cloth 22 will abut closely the upper, second disc 14. The temperature and the pressure are raised successively in the enclosure 31 by means of the heating device 33 and the compressor 34. The final levels for obtaining the thermosetting of the article 3 may for instance amount to about 2-4 bars, for instance about 3 bars (absolute) and 150-200° C., for instance about 180° C. After a suitable retention time, for instance 2-3 hours depending on the size of the article 3, the pressure and the temperature in the enclosure 31 are decreased, and the holding device may be removed from the enclosure 31. Thereafter, the cloth 22, the tearing-off cloth and the perforated plastic film are removed in such a way that the article 3 is uncovered. The article 3 is then dismounted from the holding device and ready for mounting or post treatment.

The present invention is not limited to the embodiments disclosed but may be varied and modified within the scope the following claims. Especially, it is to be noted that the articles 3 which may be manufactured by means of the holding device and the plant disclosed may have a principally arbritary shape and not in any way only the shape disclosed in the description and the drawings.

What is claimed is:

1. A holding device for holding an article, which is at least partly manufactured in a thermosetting composite material, in connection with a heat treatment a said article, wherein the holding device includes:

a base element;

an intermediate element, which rests on the base element; and at least a support member, which is fixable to the intermediate element and arranged to support said article on the intermediate element during the heat treatment, wherein the intermediate element is manufactured in a material which has a neglectable thermal expansion at least up to a temperature level at which the heat treatment is intended to take place, wherein the intermediate element is displaceably positioned on the base element, and wherein said at least one support member is at least partly manufactured in a second material which has a neglectable thermal extension at least up to a temperature level at which the heat treatment is intended to take place.

2. A holding device according to claim 1, wherein the intermediate element is at least partly manufactured in a first composite material.

3. A holding device according to claim 2, wherein the first composite material includes fibres and a plastic material.

4. A holding device according to claim 2, wherein the said fibres includes carbon fibres.

5. A holding device according to claim 1, wherein said support member is manufactured in a second composite material.

6. A holding device according to claim 1, wherein the second composite material includes fibres and a plastic material.

7. A holding device according to claim 6, wherein said fibres includes carbon fibres.

8. A holding device according to claim 1, wherein said support member is fixable to the intermediate element by means of connecting members.

9. A holding device according to claim 1, wherein the intermediate element has a thickness, which is thin in relation to the base element.

10. A holding device according to claim 1, wherein the base element is at least partly manufactured in a metal material.

11. A holding device according to claim 10, wherein the base element is at least partly manufactured in a steel material.

12. A holding device according to claim 1, wherein the holding device includes a flexible, substantially close cloth, which is arranged to be placed over the entire intermediate element, said support member and said article, wherein the holding device includes attachment means arranged to permit closing attachment of the cloth to the base element.

13. A holding device according to claim 12, wherein the holding device includes means arranged to permit removal of the gas present between the cloth and the base element.

14. A holding device according to claim 1, wherein said holding device is adapted to hold an article having a shell of a composite material and a core enclosed in the shell.

15. A plant for heat treatment of an article, which is at least partly manufactured in a thermosetting composite material, wherein the plant includes a holding device according to claim 1.

16. A plant according to claim 15, wherein the plant includes an enclosure arranged to enclose the holding device during the heat treatment.

17. A plant according to claim 15, wherein the plant includes means for successively increasing the temperature and the pressure in the enclosure to said temperature level and a desired pressure level.

* * * * *